(12) United States Patent
Wolpert et al.

(10) Patent No.: US 11,822,867 B2
(45) Date of Patent: Nov. 21, 2023

(54) HIERARCHICAL COLOR DECOMPOSITION OF PROCESS LAYERS WITH SHAPE AND ORIENTATION REQUIREMENTS

(71) Applicant: International Business Machines Corporation, Armonk, NY (US)

(72) Inventors: David Wolpert, Poughkeepsie, NY (US); Leon Sigal, Monsey, NY (US); Michael Stewart Gray, Fairfax, VT (US); Mitchell R. DeHond, Essex Junction, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 355 days.

(21) Appl. No.: 17/401,441

(22) Filed: Aug. 13, 2021

(65) Prior Publication Data
US 2023/0050539 A1 Feb. 16, 2023

(51) Int. Cl.
| | | |
|---|---|---|
| *G06F 30/398* | (2020.01) | |
| *G06F 115/12* | (2020.01) | |
| *G06F 113/18* | (2020.01) | |
| *G06F 111/04* | (2020.01) | |

(52) U.S. Cl.
CPC ........ *G06F 30/398* (2020.01); *G06F 2111/04* (2020.01); *G06F 2113/18* (2020.01); *G06F 2115/12* (2020.01)

(58) Field of Classification Search
USPC .......... 716/110, 111, 112, 50, 51, 52, 53, 54
See application file for complete search history.

(56) References Cited

U.S. PATENT DOCUMENTS

| | | |
|---|---|---|
| 6,584,610 B1 * | 6/2003 | Wu ........................ G06F 30/398 |
| | | 716/55 |
| 8,365,103 B1 | 1/2013 | Gennari et al. |
| 8,402,396 B2 | 3/2013 | Kahng et al. |
| 8,645,900 B2 | 2/2014 | Schroeder et al. |
| 8,949,758 B1 | 2/2015 | Huang et al. |
| 9,009,632 B2 | 4/2015 | Dai et al. |
| 9,026,971 B1 | 5/2015 | Ho et al. |
| 9,075,936 B2 | 7/2015 | Chen et al. |
| 9,183,341 B2 | 11/2015 | Chen et al. |
| 9,747,407 B2 | 8/2017 | Choi et al. |
| 10,261,412 B2 | 4/2019 | Choi et al. |

(Continued)

*Primary Examiner* — Brian Ngo
(74) *Attorney, Agent, or Firm* — Cantor Colburn LLP; Kelsey M. Skodje

(57) ABSTRACT

Aspects of the invention include a computer-implemented method of chip design. The computer-implemented method of chip design include establishing an architecture with alternating rows of differently colored chip-level shapes. Cells are constrained to be rectangular with restricted widths. Constraint-observing parent and child cells are generated and respectively include boundaries with alternating rows of differently colored cell-level shapes for disposition in the architecture. The parent cell is positioned in the architecture such that the cell-level shapes thereof exhibit row and color alignment with the chip-level shapes. Child cells exhibiting uni-axial or multi-axial reflectivity are instantiated in the parent cell. A color solution is instantiated for each child cell in the parent cell such that cell-level shapes of the child cells exhibit row and color alignment with the cell-level shapes of the parent cell.

20 Claims, 6 Drawing Sheets

(56) References Cited

U.S. PATENT DOCUMENTS

| | | | |
|---|---|---|---|
| 10,324,011 B2* | 6/2019 | D'Silva | G01N 15/1404 |
| 10,430,546 B2 | 10/2019 | Won et al. | |
| 10,621,300 B2 | 4/2020 | Won et al. | |
| 2002/0083410 A1* | 6/2002 | Wu | G03F 1/30 |
| | | | 716/52 |
| 2003/0023939 A1* | 1/2003 | Pierrat | G06F 30/398 |
| | | | 716/53 |
| 2003/0088837 A1* | 5/2003 | Pierrat | G06F 30/398 |
| | | | 716/106 |
| 2003/0135839 A1* | 7/2003 | Wu | G06F 30/398 |
| | | | 716/52 |
| 2005/0132320 A1 | 6/2005 | Allen et al. | |
| 2008/0298688 A1* | 12/2008 | Cheong | G06V 10/56 |
| | | | 382/162 |
| 2014/0123091 A1* | 5/2014 | Buck | G06F 30/392 |
| | | | 716/122 |
| 2015/0089457 A1* | 3/2015 | Agarwal | G03F 1/70 |
| | | | 716/52 |

* cited by examiner

HIERARCHICAL COLOR DECOMPOSITION OF PROCESS LAYERS WITH SHAPE AND ORIENTATION REQUIREMENTS

BACKGROUND

The present invention generally relates to circuit design and more specifically, to hierarchical circuit design that makes use of hierarchical color decomposition of process layers with shape and orientation requirements.

Lithography is an optical patterning process that patterns a material, e.g., photoresist, which is then developed to define a mask for integrated circuit fabrication processes. Reducing feature sizes to be smaller than the wavelength of light used to form the pattern in photoresist is referred to as sub-wavelength lithography. Sub-wavelength lithography presents many challenges to manufacturers trying to maintain the economic scaling of semiconductors postulated by Moore's Law. Double patterning lithography techniques are sub-wavelength techniques that are used to achieve sub 45 nm nodes with presently available manufacturing equipment. A standard single photoresist pattern begins to blur at about 45 nm feature size. With double patterning lithography methods, coarse patterns can be used to define patterns that exceed the resolution limit of the optical lithography tool used to pattern the material being patterned and developed as a mask.

As Moore's law continues to drive performance and integration with smaller circuit features, lithography is pushed to new extremes. For 32 nm node patterning, prospects for new lithography techniques such as extreme ultraviolet (EUV) and immersion ArF (IArF) are unclear. An EUV imaging system is composed of mirrors coated with multilayer structures designed to have high reflectivity at a 13.5 nm wavelength. There are significant technical hurdles to the implementation of EUV lithography in terms of mask-blank fabrication, high output power source, resist material, etc. Challenges to production use of IArF include very high-refractive index fluids (to enable NA=1.55~1.6), and accompanying advances in high-index resists and optical materials.

SUMMARY

Embodiments of the present invention are directed to hierarchical color decomposition of dual-patterned lithography process layers with shape and orientation requirements.

A non-limiting example includes a computer-implemented method of chip design. The computer-implemented method of chip design includes establishing an architecture with alternating rows of differently colored chip-level shapes. Cells are constrained to be rectangular with restricted widths. Constraint-observing parent and child cells are generated and respectively include boundaries with alternating rows of differently colored cell-level shapes for disposition in the architecture. The parent cell is positioned in the architecture such that the cell-level shapes thereof exhibit row and color alignment with the chip-level shapes. Child cells exhibiting uni-axial or multi-axial reflectivity are instantiated in the parent cell. A color solution is instantiated for each child cell in the parent cell such that cell-level shapes of the child cells exhibit row and color alignment with the cell-level shapes of the parent cell.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
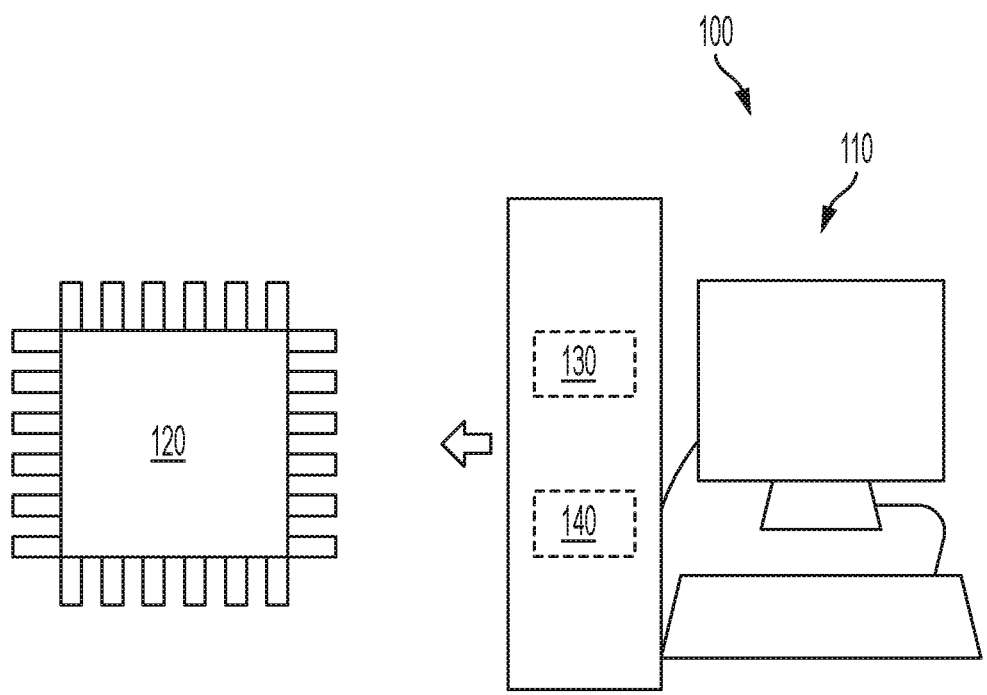
FIG. 1 illustrates a system to perform a computer-implemented method of chip design in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide for hierarchical chip design that does not rely on automated color decomposition algorithms at the chip level to catch odd cycle issues deep in the chip design hierarchy. The hierarchical chip design establishes an architecture with alternating rows of differently colored chip-level shapes. Cells are constrained to be rectangular with restricted widths. Constraint-observing parent and child cells are generated and respectively include boundaries with alternating rows of differently colored cell-level shapes for disposition in the architecture. The parent cell is required to provide a set of color permutations for each possible orientation of the parent cell in the next level of hierarchy to allow the next level of hierarchy to be positioned in the architecture such that the parent's cell-level shapes exhibit row and color alignment with the chip-level shapes. The parent cell is positioned in the architecture such that the cell-level shapes thereof exhibit row and color alignment with the chip-level shapes. Child cells exhibiting uni-axial or multi-axial reflectivity are instantiated in the parent cell in a colorless fashion (i.e., without coloring information). A color solution is instantiated for each child cell in the parent cell such that cell-level shapes of the child cells exhibit row and color alignment with the cell-level shapes of the parent cell. This process is thus built up across the hierarchy (or pushed down from upper levels of the hierarchy) to ensure correct-by-construction shape alignment across all levels of the hierarchy without the need for time-consuming and complex chip-level coloring operations.

Hierarchical circuit design refers to systems in which layers of abstraction are used to enable concurrent design of embedded components and top-level components. In some cases, a hierarchical circuit design can include various layers with blocks of each layer. A chip layer can contain a chiplet layer, the chiplet layer can contain a core layer, the core layer can contain a unit layer and the unit layer can contain a random logic macro layer. Each layer can contain a child layer of hierarchy, custom designed circuit layer, and/or logic gates (e.g., NAND gates, OR gates, AND gates, XOR gates, NOR gates, etc.).

The desire to abstract embedded components can result in false verification fails that do not show up when the hierarchy is flattened but do prevent a piece of the hierarchy from achieving clean testing (or checking) grades. Also, the abstracted approach can drown out real fails, which may potentially cause design defects.

The creation of a simple checking cell within the hierarchical circuit design can be insufficient to test the hierarchical circuit design adequately because the shapes added depend on the type of embedded design. That is, a verification tool handling the abstracted areas may not know what is inside those areas by looking at the shapes available and some designs need separate types of north/south (N/S) and east/west (E/W) fill indicators while others only need a N/S fill indicator.

Therefore, relying on automated decomposition algorithms at the chip level to catch odd cycle issues deep in a hierarchy is non-optimized scenario, where fails buried deep in the hierarchy might only be found at the chip level and require multiple iterations of fix-up across the hierarchy.

One or more embodiments of the present invention address one or more of the above-described shortcomings of the prior art by providing for an approach that relates to correct-by-construction design methods that effectively avoid the need for automated tooling to create its own internal hierarchy and the use of automated decomposition algorithms. This per-hierarchy technique enables correct-by-construction color decomposition, where each macro can check their results and guarantee colorability across the hierarchy and there is no need for re-work for odd-cycle violations during chip assembly. The method also improves chip decomposition runtimes because it is only necessary to decompose the top level-owned area of a chip instead of the entire chip area. In addition, child updates are enabled to be "plug and play" at the chip level with packaged coloring solutions instead of having to re-run chip coloring every time a child cell is updated. One example embodiment includes enablement of fin cut (FC) color decomposition as a relatively simply y-lookup instead of complex automatic color decomposition routines.

FIG. 1 is a block diagram of a system 100 to perform a computer-implemented method of chip design according to embodiments of the invention. The system 100 includes processing circuitry 110 used to generate the design that is ultimately fabricated into an integrated circuit 120. The steps involved in the fabrication of the integrated circuit 120 are well-known and briefly described herein. Once the physical layout is finalized, based, in part, on [reference invention again] according to embodiments of the invention to facilitate optimization of the routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 7.

Figure 2:
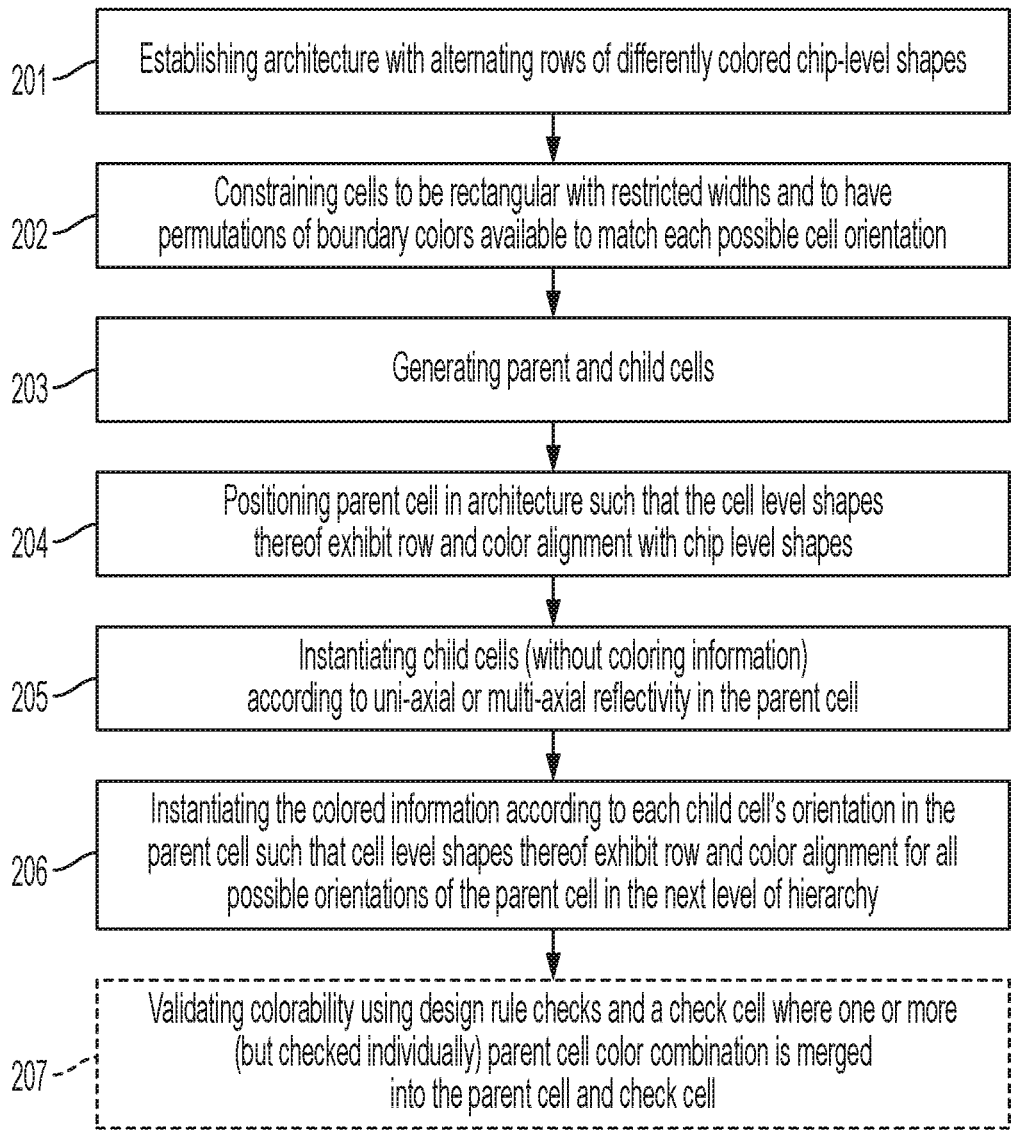
FIG. 2 is a flow diagram illustrating a computer-implemented method of chip design in accordance with one or more embodiments of the present invention.

With reference to FIG. 2, a computer-implemented method of chip design is provided in accordance with one or more embodiments of the present invention. The computer-implemented method includes establishing an architecture with alternating rows of differently colored chip-level shapes (201). Cells are constrained to be rectangular with restricted widths (202). Constraint-observing parent and child cells are generated and respectively include boundaries with alternating rows of differently colored cell-level shapes for disposition in the architecture (203). The parent cell is required to provide a set of color permutations for each possible orientation of the parent cell in the next level of hierarchy to allow the next level of hierarchy to be positioned in the architecture such that the parent's cell-level shapes exhibit row and color alignment with the chip-level shapes and the parent cell is positioned in the architecture such that the cell-level shapes thereof exhibit row and color alignment with the chip-level shapes (204). Child cells exhibiting uni-axial or multi-axial reflectivity are instantiated in the parent cell in a colorless fashion without coloring information (205). A color solution is instantiated for each child cell in the parent cell such that cell-level shapes of the child cells exhibit row and color alignment with the cell-level shapes of the parent cell (206). This process is thus built up across the hierarchy (or pushed down from upper levels of the hierarchy) to ensure correct-by-construction shape alignment across all levels of the hierarchy without the need for time-consuming and complex chip-level coloring operations. In addition, a design rule check is established with respect to a given level of hierarchy (207).

As used herein, abutting corners refer to a situation where two rectangular cells only touch at one point (i.e., the lower-right corner of one rectangle touching the upper-left corner of another rectangle). A case of different-color abutting corners being allowed is a special condition for two shapes that would normally need to either share an edge or be "diff-color spacing" apart. In the different-color abutting corners being allowed cases, different color corners are allowed or permitted to be positioned against each other. This effectively enables the patterns to be designed as described below. Different-colored corners being allowed can be summarized or alternatively referred to as a case of "meeting technology constraints."

When a parent color cell is merged as in operation 207 of FIG. 2, the parent color cell is placed into the parent cell just for checking and without color information does not exist in the data that is passed on (i.e., from the parent cell to its parent cell, i.e. the grandparent cell). For example, when the parent cell needs to be checked for design rule cleanliness as in operation 207 of FIG. 2, the parent cell may have to instantiate in one set of color information or else it will fail a rule that says "all shapes must be colored." When the parent cell is being passed on to a grandparent cell, the parent cell does not know what its orientation is inside of the grandparent cell, so it is handed over without any color information in it. Instead, the parent cell passes both the R0 ("as-designed" orientation) or MY (orientation after R0 is flipped over the Y-axis) and MX (orientation after the R0 is flipped over the X-axis) or R180 (orientation after the R0 is flipped over the X and Y axes) versions of the color information to the grandparent cell and lets the grandparent cell pick whichever version is appropriate. Thus, as an example, the grandparent cell can pick the R0 or R180 versions of the parent cell, depending on which version comports with the color requirements of the grandparent cell. Thus, it is seen that "merging" refers to the inclusion of colored data in a cell without color information that is needed for checking that cell but is not transmitted to the next level of hierarchy.

In contrast, when the parent cell is looking at a child cell, the parent cell knows what the orientation of the child cell is, so the parent cell can permanently place the child cell (e.g., ChildA [R0], ChildA [MY], ChildA [MX] or ChildA [R180]) in the parent cell depending on the child cell's orientation. Because the color information of the child cell is always locked in for that particular placement instance of the child cell, the parent cell instantiates the color information for the child cell.

Figure 4:
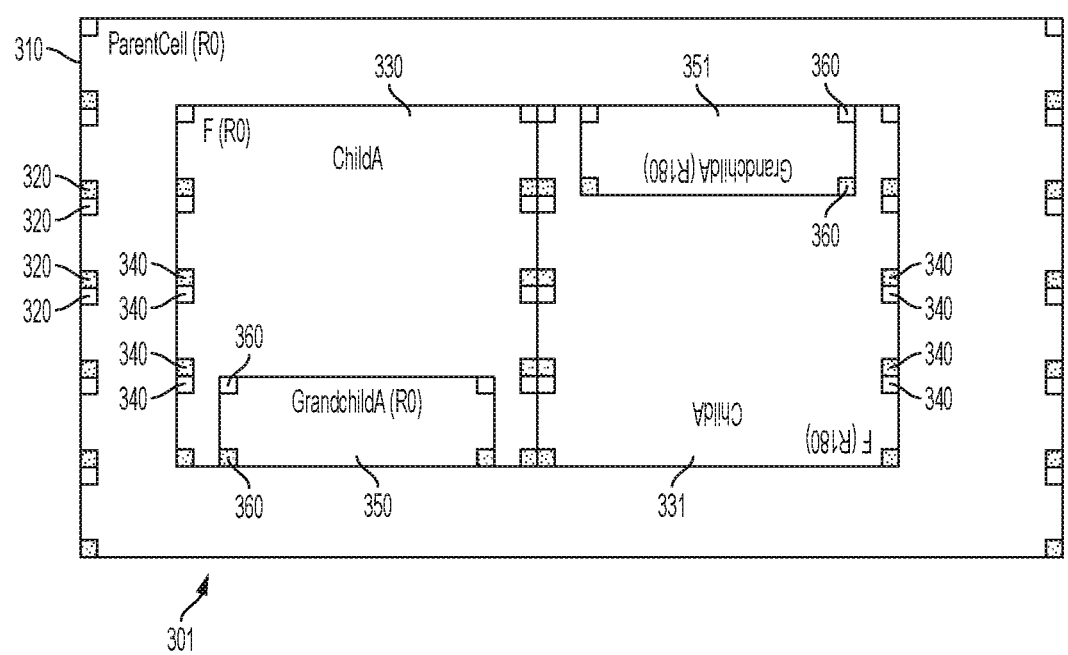
FIG. 4 is a schematic diagram illustrating a parent cell with abutting child cells and grandchild cells which can be designed by the computer-implemented method of FIG. 2 and in accordance with one or more embodiments of the present invention.
Figure 5:
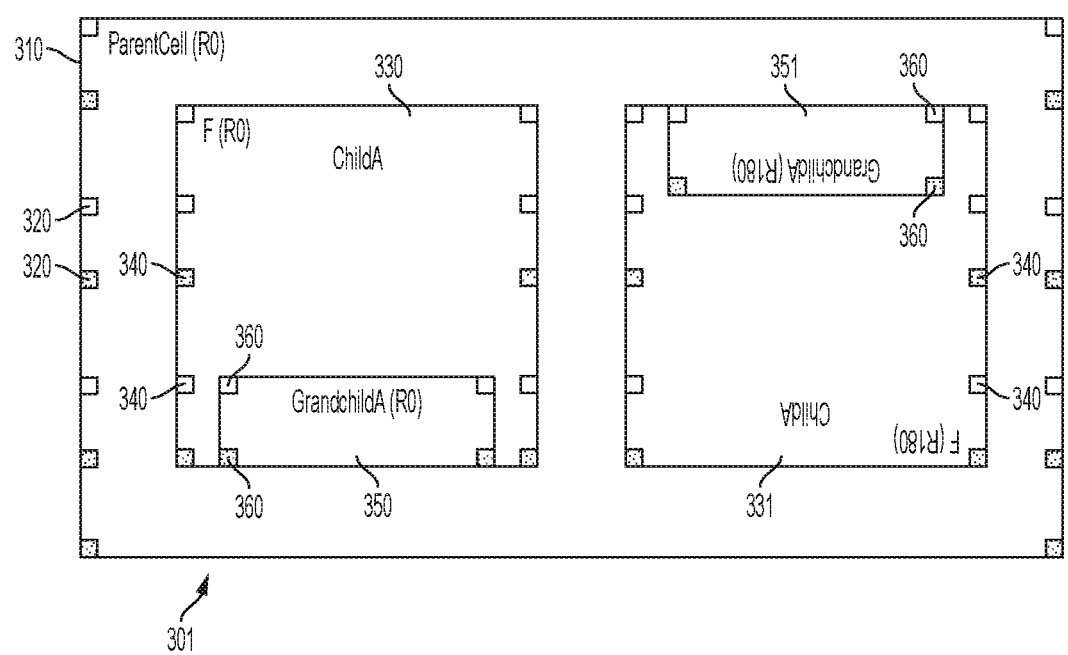
FIG. 5 is a schematic diagram illustrating a parent cell with non-abutting sequential rows of chip-level and cell-level shapes which can be designed by the computer-implemented method of FIG. 2 and in accordance with one or more embodiments of the present invention.

In accordance with one or more further embodiments of the present invention, sequential rows of the alternating rows of differently colored chip-level shapes can either abut with one another (see FIGS. 3 and 4) or can be configured such that they do not abut with one another (see FIG. 5). In addition, it is to be understood that the uni-axial reflectively of operation 205 is exhibited by child cell pairs in which each child cell has a same structure and one is reflected about one axis (i.e., the X-axis or the Y-axis) as compared to the other. The multi-axial reflectively of operation 205 is exhibited by child cell pairs in which each child cell has a same structure and one is reflected about multiple axes (see the child cell pairs in FIGS. 3-5) as compared to the other.

Figure 3:
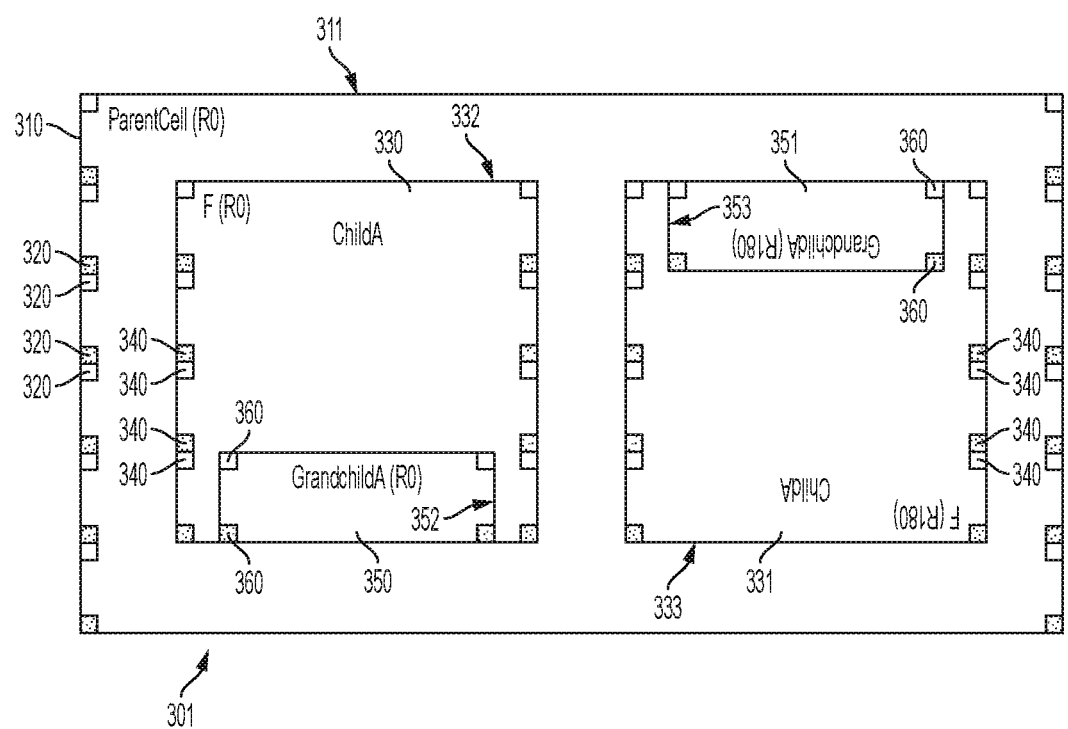
FIG. 3 is a schematic diagram illustrating a parent cell with child and grandchild cells which can be designed by the computer-implemented method of FIG. 2 and in accordance with one or more embodiments of the present invention.

In accordance with one or more further embodiments of the present invention, child cells can abut with one another (see FIG. 4) or not abut with one another (see FIGS. 3 and 5). In addition, the child cells can themselves include grandchild cells exhibiting a same uni-axial or multi-axial reflectively as the child cells (see FIGS. 3-5). In these or other cases, the grandchild cells are instantiated within each child cell in the parent cell such that the cell-level shapes thereof exhibit row and color alignment with the shapes at the next level of hierarchy.

With reference to FIG. 3, an instance of a chip design hierarchy 301 is provided and can be designed according to the computer-implemented method of FIG. 2.

The chip design hierarchy 301 includes a parent cell 310 in the R0 orientation and the parent cell 310 has boundaries 311 that are lined with alternating rows of differently colored cell-level shapes 320. When the parent cell 310 is placed in a next level of hierarchy that itself has alternating rows of differently colored chip-level or cell-level shapes, the alternating rows of differently colored cell-level shapes 320 of the parent cell 310 exhibit row and color alignment with the alternating rows of differently colored chip-level or cell-level shapes of the next level of hierarchy. That is, in an exemplary case in which the parent cell is instantiated or placed in a grandparent cell (i.e., the next level up in the chip design hierarchy), the alternating rows of differently colored cell-level shapes 320 of the parent cell 310 exhibit row and color alignment with alternating rows of differently colored grandparent cell-level shapes.

The chip design hierarchy 301 further includes an example child cell 330 in the R0 orientation and child cell 331 in the R180 orientation, which means that child cell 331 exhibits multi-axial reflectively with respect to child cell 330, having been reflected about the X and Y axes. Each of the child cell 330 and child cell 331 includes a boundary 332, 333 with alternating rows of differently colored cell-level shapes 340 that exhibit row and color alignment with the cell-level shapes 320 of the parent cell 310.

As explained above, when the child cell 330 and the child cell 331 are instantiated as in operation 205 of FIG. 2, a consistent permutation of coloring information including that of the child cell 330, the child cell 331, and the parent cell 310 are used for checking of the parent cell 310, but do not exist in the data that is passed on (i.e., from the parent cell 310 to grandparent cell). The child cell 330 and the child cell 331 do not know what their orientations are inside of the parent cell 310 and it is the parent cell 310 that must pick the R0 color solution of the child cell 330 and the R180 color solution of the child cell 331, assuming these versions comport with the color requirements of the parent cell 310.

When the parent cell 310 looks at the child cell 330 and the child cell 331, the parent cell 310 knows what the orientations of the child cell 330 and the child cell 331 are, and so the parent cell 310 can permanently place the child cell 330 and the child cell 331 in the parent cell 310. At this point, because the color information of the child cell 330 and the child cell 331 is locked in for that particular placement instance, the parent cell 310 instantiates the color information for the child cell 330 and the child cell 331. The parent cell 310 must provide color solutions to the grandparent cell for all possible parent cell orientations, meaning the R0 parent cell coloring solution might contain the R0 color solution for child cell 330 and the R180 color solution for child cell 331, while the R180 parent cell coloring solution might contain the R180 color solution for child cell 330 and the R0 color solution for child cell 331.

The chip design hierarchy 301 further includes grandchild cell 350 in the R0 orientation and grandchild cell 351 in the R180 orientation, which means that grandchild cell 351 exhibits multi-axial reflectivity with respect to child cell 350, having been reflected about the X and Y axes. This multi-axial reflectivity is the same as the multi-axial reflectivity exhibited by the child cell 330 and the child cell 331. Each of the grandchild cell 350 and grandchild cell 351 includes a boundary 352, 353 with alternating rows of differently colored cell-level shapes 360 that exhibit row and color alignment with the cell-level shapes 320 of the parent cell 310 and the cell level shapes 340 of the child cell 330 and the child cell 331.

In accordance with one or more further embodiments of the present invention and with continued reference to FIG. 3 and with additional reference to FIGS. 4 and 5, the chip design hierarchy 301 can be provided such that the child cell 330 and the child cell 331 do not abut with one another (see FIG. 3) or such that the child cell 330 and the child cell 331 abut one another within the parent cell 310 (see FIG. 4) and/or that sequential rows of the alternating rows of differently colored cell-level shapes 320, 340 and 360 abut with one another (see FIGS. 3 and 4) or that the sequential rows of the alternating rows of differently colored cell-level shapes 320, 340 and 360 do not abut with one another (see FIG. 5).

Figure 6:
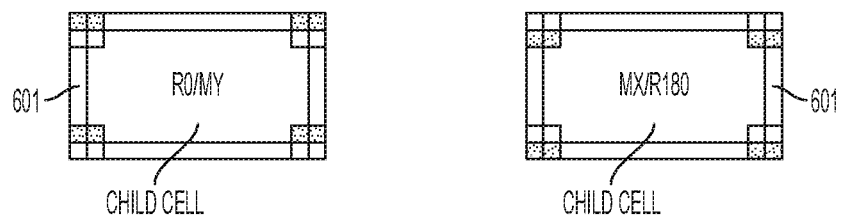
FIG. 6 is a schematic illustration of a design rule check box that can be placed into a given hierarchy level with a cell to ensure that the cell satisfies out-of-context checking in accordance with one or more embodiments of the present invention.

In accordance with one or more additional embodiments of the present invention and with reference to FIG. 6, a design rule check (DRC) can be established for any given level of hierarchy. This DRC can be embodied as a DRC cell 601 and mimics what the cell will see when it is placed into the next level of hierarchy. This ensures that "this cell" will see any issues that might be caused by getting plugged into a parent cell without actually having to wait for the parent cell to plug it in and run checking on it and feed those fails back down to this cell.

It is to be understood that the constraints placed on the parent cell 310 in the computer-implemented chip design described herein are such that the child cell 330 has to have a same structure as the child cell 331. As such, since the child cell 330 includes the grandchild cell 350, the parent cell 310 can only instantiate a child cell 331 that includes the grandchild cell 351.

Figure 7:
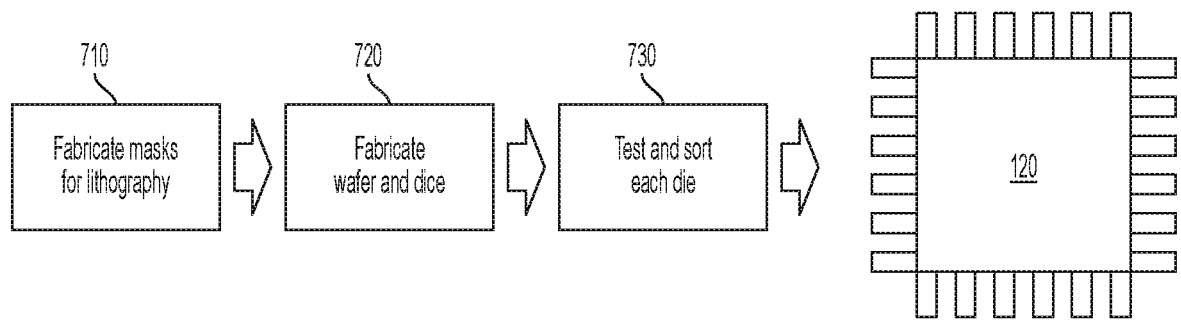
FIG. 7 is a process flow of a method of fabricating an integrated circuit in accordance with one or more embodiments of the present invention.

FIG. 7 is a process flow of a method of fabricating an integrated circuit according to exemplary embodiments of the invention. Once the physical design data is obtained, based, in part, on the computer-implemented method of chip design described herein, the integrated circuit 120 can be fabricated according to known processes that are generally described with reference to FIG. 7. Generally, a wafer with multiple copies of the final design is fabricated and cut (i.e., diced) such that each die is one copy of the integrated circuit 120. At block 710, the processes include fabricating masks for lithography based on the finalized physical layout. At block 720, fabricating the wafer includes using the masks to perform photolithography and etching. Once the wafer is diced, testing and sorting each die is performed, at block 730, to filter out any faulty die.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of chip design, comprising:
    establishing an architecture with alternating rows of differently colored chip-level shapes;
    constraining cells to be rectangular with restricted widths;
    generating constraint-observing parent and child cells respectively comprising boundaries with alternating rows of differently colored cell-level shapes for disposition in the architecture;
    positioning the parent cell in the architecture such that the cell-level shapes thereof exhibit row and color alignment with the chip-level shapes;
    instantiating child cells exhibiting uni-axial or multi-axial reflectivity in the parent cell; and
    instantiating a color solution for each child cell in the parent cell such that cell-level shapes of the child cells exhibit row and color alignment with the cell-level shapes of the parent cell.

2. The computer-implemented method according to claim 1, wherein sequential rows of the alternating rows of differently colored chip-level shapes abut with one another.

3. The computer-implemented method according to claim 1, wherein sequential rows of the alternating rows of differently colored chip-level shapes do not abut with one another.

4. The computer-implemented method according to claim 1, wherein:
    the uni-axial reflectively is exhibited by the child cells in that each child cell has a same structure and one is reflected about one axis as compared to the other, and
    the multi-axial reflectively is exhibited by the child cells in that each child cell has a same structure and one is reflected about multiple axes as compared to the other.

5. The computer-implemented method according to claim 1, wherein:
    the child cells comprise grandchild cells exhibiting a same uni-axial or multi-axial reflectivity as the child cells, and
    the grandchild cells are instantiated with the child cells in the parent cell such that the cell level shapes of the grandchild cells exhibit row and color alignment with the cell-level shapes of the parent cell.

6. The computer-implemented method according to claim 1, wherein at least one of:
    the child cells abut with one another,
    the child cells do not abut with one another.

7. The computer-implemented method according to claim 1, further comprising establishing a design rule check with respect to a given level of hierarchy.

8. A method, comprising:
    establishing an architecture with alternating rows of differently colored chip-level shapes;
    constraining cells to be rectangular with restricted widths;
    generating constraint-observing parent and child cells respectively comprising boundaries with alternating rows of differently colored cell-level shapes for disposition in the architecture;
    positioning the parent cell in the architecture such that the cell-level shapes thereof exhibit row and color alignment with the chip-level shapes;
    instantiating child cells exhibiting uni-axial or multi-axial reflectivity in the parent cell; and
    instantiating a color solution for each child cell in the parent cell such that cell-level shapes of the child cells exhibit row and color alignment with the cell-level shapes of the parent cell.

9. The method according to claim 8, wherein sequential rows of the alternating rows of differently colored chip-level shapes abut with one another.

10. The method according to claim 8, wherein sequential rows of the alternating rows of differently colored chip-level shapes do not abut with one another.

11. The method according to claim 8, wherein:
    the uni-axial reflectively is exhibited by the child cells in that each child cell has a same structure and one is reflected about one axis as compared to the other, and
    the multi-axial reflectively is exhibited by the child cells in that each child cell has a same structure and one is reflected about multiple axes as compared to the other.

12. The method according to claim 8, wherein:
    the child cells comprise grandchild cells exhibiting a same uni-axial or multi-axial reflectively as the child cells, and
    the grandchild cells are instantiated with the child cells in the parent cell such that the cell level shapes of the grandchild cells exhibit row and color alignment with the cell-level shapes of the parent cell.

13. The method according to claim 8, wherein at least one of:
    the child cells abut with one another,
    the child cells do not abut with one another.

14. The method according to claim 8, further comprising establishing a design rule check with respect to a given level of hierarchy.

15. A system, comprising:
    a memory having computer readable instructions; and
    one or more processors for executing the computer readable instructions, the computer readable instructions controlling the one or more processors to perform operations comprising:
        establishing an architecture with alternating rows of differently colored chip-level shapes;
        constraining cells to be rectangular with restricted widths;
        generating constraint-observing parent and child cells respectively comprising boundaries with alternating rows of differently colored cell-level shapes for disposition in the architecture;
        positioning the parent cell in the architecture such that the cell-level shapes thereof exhibit row and color alignment with the chip-level shapes;
        instantiating child cells exhibiting uni-axial or multi-axial reflectivity in the parent cell; and
        instantiating a color solution for each child cell in the parent cell such that cell-level shapes of the child cells exhibit row and color alignment with the cell-level shapes of the parent cell.

16. The system according to claim 15, wherein sequential rows of the alternating rows of differently colored chip-level shapes abut with or do not abut with one another.

17. The system according to claim 15, wherein:
the uni-axial reflectively is exhibited by the child cells in that each child cell has a same structure and one is reflected about one axis as compared to the other, and
the multi-axial reflectively is exhibited by the child cells in that each child cell has a same structure and one is reflected about multiple axes as compared to the other.

18. The system according to claim 15, wherein:
the child cells comprise grandchild cells exhibiting a same uni-axial or multi-axial reflectively as the child cells, and
the grandchild cells are instantiated with the child cells in the parent cell such that the cell level shapes of the grandchild cells exhibit row and color alignment with the cell-level shapes of the parent cell.

19. The system according to claim 15, wherein at least one of:
the child cells abut with one another,
the child cells do not abut with one another.

20. The system according to claim 15, further comprising establishing a design rule check with respect to a given level of hierarchy.

\* \* \* \* \*